(12) United States Patent
Iskanius

(10) Patent No.: US 6,693,435 B2
(45) Date of Patent: Feb. 17, 2004

(54) METHOD AND APPARATUS FOR MEASURING A MEASURING SIGNAL AND REFLECTED MEASURING SIGNAL

(75) Inventor: Matti Iskanius, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/808,279

(22) Filed: Mar. 14, 2001

(65) Prior Publication Data

US 2001/0040457 A1 Nov. 15, 2001

Related U.S. Application Data

(63) Continuation of application No. PCT/FI99/00754, filed on Sep. 14, 1999.

(30) Foreign Application Priority Data

Sep. 15, 1998 (FI) .................................................. 981990

(51) Int. Cl.7 ............................................. G01R 31/11
(52) U.S. Cl. ...................................... 324/534; 324/533
(58) Field of Search ............................... 324/534, 527, 324/525, 520, 533; 73/598

(56) References Cited

U.S. PATENT DOCUMENTS 3,751,606 A * 8/1973 Kaiser, Jr. .................... 324/520
4,630,228 A * 12/1986 Tarczy-Hornoch .......... 324/542
4,649,335 A    3/1987 Lassaux et al.
4,791,351 A   12/1988 Le Traon et al.
5,365,328 A   11/1994 Anderson
5,594,174 A *  1/1997 Keefe .......................... 73/598

FOREIGN PATENT DOCUMENTS

| DE | 44 17 838 | 12/1994 |
|---|---|---|
| DE | 196 47 744 | 5/1998 |
| EP | 0 365 371 | 4/1990 |
| JP | 5188105 | 7/1993 |

* cited by examiner

Primary Examiner—N. Le
Assistant Examiner—Timothy J. Dole
(74) Attorney, Agent, or Firm—Squire, Sanders & Dempsey L.L.P.

(57) ABSTRACT

A measuring method and a measuring apparatus which transmits to a transmission line a measuring signal, a part of which is reflected back to the measuring apparatus which comprises a processor which measures the reflected signal. The processor transmits a measuring signal to the transmission line and the processor measures the magnitude of the measuring signal before the measuring signal is transmitted and the processor compares the measuring result with the magnitude of the reflected measuring signal. In addition, the processor calculates a reflection coefficient for the transmission line in the frequency domain by means of the measuring results. Further, the processor calculates an impulse response for the transmission line by means of the refection coefficient in the frequency domain.

13 Claims, 2 Drawing Sheets

|  |  |  |  |  |  |  |  |
|---|---|---|---|---|---|---|---|
| R0 | 100 |  |  |  |  |  |  |
| RL | 1000 |  |  |  |  |  |  |
| CL | 1.00E-06 |  |  |  |  |  |  |
|  |  | V2 |  | ρT |  | IDFT |  |
| F | V1 | Real | Imag | Real | Imag | Real | Imag |
| 0 | 1 | 0.909 | 0.000 | 0.818 | 0.000 | 0.559 | 0.530 |
| 100 | 1 | 0.906 | 0.052 | 0.812 | 0.104 | 0.145 | 0.055 |
| 200 | 1 | 0.897 | 0.103 | 0.795 | 0.205 | 0.086 | 0.014 |
| 300 | 1 | 0.883 | 0.151 | 0.766 | 0.303 | 0.062 | -0.004 |
| 400 | 1 | 0.864 | 0.197 | 0.728 | 0.395 | 0.049 | -0.014 |
| 500 | 1 | 0.841 | 0.240 | 0.681 | 0.480 | 0.039 | -0.021 |
| 600 | 1 | 0.814 | 0.279 | 0.627 | 0.558 | 0.031 | -0.028 |
| 700 | 1 | 0.784 | 0.313 | 0.568 | 0.627 | 0.024 | -0.033 |
| 800 | 1 | 0.752 | 0.344 | 0.504 | 0.687 | 0.017 | -0.039 |
| 900 | 1 | 0.719 | 0.370 | 0.438 | 0.739 | 0.009 | -0.046 |
| 1000 | 1 | 0.685 | 0.392 | 0.371 | 0.783 | -0.002 | -0.055 |
| 1100 | 1 | 0.652 | 0.410 | 0.304 | 0.819 | -0.017 | -0.068 |
| 1200 | 1 | 0.619 | 0.424 | 0.237 | 0.848 | -0.047 | -0.095 |
| 1300 | 1 | 0.586 | 0.435 | 0.172 | 0.870 | -0.137 | -0.196 |

Fig. 3

METHOD AND APPARATUS FOR MEASURING A MEASURING SIGNAL AND REFLECTED MEASURING SIGNAL

This application is a continuation of international application serial number PCT/FI99/00754, filed Sep. 14, 1999.

FIELD OF THE INVENTION

The invention relates to a measuring method in which a measuring signal, a part of which is reflected back, is transmitted to a transmission line and in which method the reflected signal is measured.

BACKGROUND OF THE INVENTION

Signals between the equipment of a fixed transmission network in various locations are typically transmitted by means of signal conductors. A transmission path comprising several signal conductors is usually called a cable. Cables can be divided for instance by their installation sites into aerial, underground, channel, underwater and inside cables. In cables, a signal attenuates relatively quickly, which is why signals are amplified when necessary. Signal conductors are typically made of copper or an alloy, for instance.

Cables typically comprise several insulating layers and a sheath which protects the signal conductors from mechanical strain and humidity, for instance. The sheath can be of metal or a plastic or rubber compound, for instance. An individual signal conductor or an entire cable can, however, in some cases break or be damaged, in which case the transmission properties of the conductor deteriorate.

Various methods are used for checking the condition of a signal conductor. In a known method, a short voltage impulse is transmitted to the signal conductors forming a subscriber line, after which the return reflection of the transmitted signal is measured. This way, any discontinuities in the subscriber line can be found and the line repaired.

However, the above method provides the disadvantage that the implementation of the measuring apparatus executing the method is very complex. The measuring apparatus must detect a fast impulse, whose amplitude level can be very low, in the time domain. This requires great speed and sensitivity of the measuring apparatus. Since the measuring apparatus is of a complex design, its implementation is very expensive.

BRIEF DESCRIPTION OF THE INVENTION

It is thus an object of the invention to implement a method and an apparatus implementing the method so as to solve the above problems. This is achieved by a method described in the preamble, which is characterized by transmitting a measuring signal to a transmission line being measured, measuring the magnitude of the measuring signal before it is transmitted to the transmission line, comparing the obtained measuring result with the magnitude of the measuring signal reflected back from the transmission line, calculating a reflection coefficient in the frequency domain by means of the obtained measuring results, and calculating an impulse response for the transmission line by means of the reflection coefficient in the frequency domain.

The invention also relates to a measuring apparatus which transmits a measuring signal to the transmission line, a part of which signal is reflected back to the measuring apparatus which comprises a processing means for measuring the reflected signal.

The measuring apparatus of the invention is characterized in that the processing means transmits a measuring signal to the transmission line, the processing means measures the magnitude of the signal before transmitting it, the processing means compares the measuring result with the magnitude of the reflected measuring signal, the processing means calculates a reflection coefficient in the frequency domain by means of the obtained measuring results, the processing means calculates an impulse response for the transmission line by means of the reflection coefficient in the frequency domain.

Preferred embodiments of the invention are set forth in the dependent claims.

The invention is based on the idea that a signal is transmitted to a transmission line and, on the basis of the signal reflected back from the transmission line, a reflection coefficient is calculated in the frequency domain, after which the frequency-domain signal is converted into the time domain.

The measuring method and apparatus of the invention provides several advantages. In the method, frequency-domain measurement is used, whereby a impulse response of the signal can be easily calculated. The measuring apparatus can be implemented with relatively easy connections, which makes it inexpensive to implement. The measurements performed by the measuring apparatus can be implemented with relatively slow components. In addition to this, the measuring apparatus can be implemented with low-sensitivity components.

BRIEF DESCRIPTION OF THE DRAWINGS

In the following, the invention will be described in connection with preferred embodiments with reference to the attached drawings in which FIG. 3 shows a table of measuring results.

DETAILED DESCRIPTION OF THE INVENTION

Figure 1:
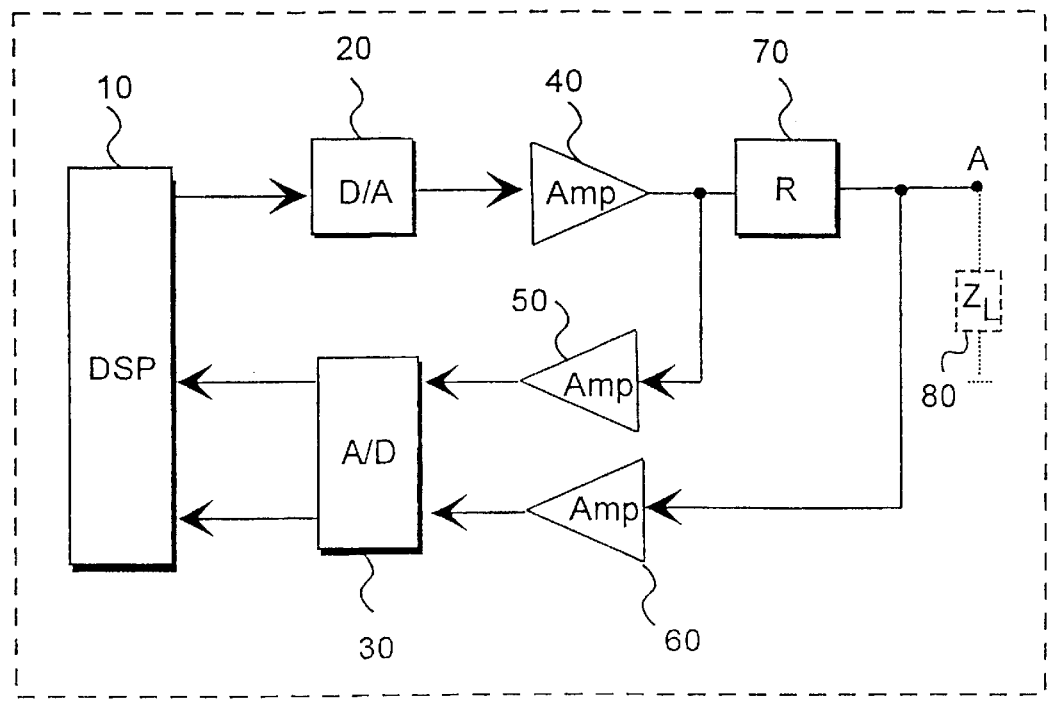
FIG. 1 shows a measuring apparatus of the invention.

FIG. 1 shows a measuring apparatus used for checking the condition of a transmission line. The measuring apparatus comprises a signal processing means 10, a D/A converter 20, an A/D converter 30, amplifying means 40, 50, 60, and an attenuating means 70. In FIG. 1, the output side of the processing means 10 feeds a digital signal to the input side of the D/A converter. In addition, the output side of the D/A converter 20 is connected to the input side of the amplifying means 40, and the output side of the amplifying means 40 is connected to the attenuating means 70. The attenuating means can be implemented with a measuring resistor, for instance. The amplifying means 40, 50, 60 can be implemented with operational amplifiers, for instance.

The A/D converter 30 in the measuring apparatus is on its output side connected to the signal processing means 10. The input side of the A/D converter is connected to the output side of the amplifying means 50, 60. The input side of the amplifying means 50 is connected to the same side of the attenuating means as the output side of the amplifying means 40. The input side of the amplifying means 60 and the input side of the amplifying means 50 are connected to the attenuating means 70 from different sides.

Point A, to which the line being measured is connected, is marked in the figure. In the solution of the figure, point A is connected to the attenuating means and to the input side of the amplifying means 60. Cables, in which the signals propagate in the metal part of the transmission line, can be measured with the measuring apparatus. Impedance 80, which illustrates the impedance of the line being measured, is also marked in FIG. 1. The transmission line can be a twin cable, for instance, with a specific impedance of 600 Ω, for instance. The resistance value of the measuring resistor used as an attenuator is preferably about the same as the impedance of the transmission line being measured. For instance, POTS (Plain Old Telephone. Service), ISDN (Integrated Services Digital Network) and xDSL (Digital Subscriber Line) lines can be measured with the measuring apparatus of the invention.

Signals in digital format can be stored in advance in the measuring apparatus and by processing the signals, it is possible to produce the measuring signal. The digital signal can be stored in the processing means 10, for instance. The processing means can also before the measuring generate a digital signal which is further processed to a desired type of measuring signal. In practice, the processing means 10 is implemented with a signal processor or microprocessor.

The measuring apparatus functions in the transmission direction as follows. The processing means 10 retrieves from its memory a signal which is forwarded to the D/A converter 20 which converts the received digital signal into an analogue signal. The signal need not necessarily be retrieved from memory, but a digital signal can, if necessary, be generated by another method, too. The signal converted into analogue format is forwarded to the amplifying means 40 which amplifies the received signal to a predefined level. The amplifying means 50 forms a feedback loop on the transmission side of the measuring apparatus. By means of the feedback loop, the magnitude of the measuring signal to be transmitted is measured, whereby the reflection coefficient can be defined accurately.

Because the feedback signal is obtained between the amplifying means 40 and the attenuating means 70, the value of the signal to be transmitted to the transmission line can be defined as accurately as possible. This way, the impact of the output impedance of the amplifying means 40 on the magnitude of the signal to be transmitted can also be compensated. The magnitude of the signal to be transmitted to the transmission line can also be determined by measuring the current, for instance. If the output signal of the amplifying means 40 was always exactly known, the amplifying means 50 could be left out of the measuring apparatus.

The analogue signal received from the output of the amplifying means 40 is forwarded to the line being measured through the attenuating means 70. The analogue signal which has passed through the attenuating means 70 and which is a measuring signal is transmitted to the line being measured. The measuring signal can be a sinusoidal signal, for instance. The measuring signal can be transmitted on predefined frequencies, for instance. In addition, the measuring signal can be transmitted by sweeping the signal over a certain frequency band. If necessary, the transmission of the measuring signal can be continuous. In addition, the transmission of the measuring signal and the measuring and processing of the reflected signal can be performed simultaneously.

A part of the measuring signal transmitted to the line being measured is reflected back to the measuring apparatus. Reflections are caused by any possible discontinuities on the line. The amplitude of a reflected signal is typically very small as compared with the amplitude of a measuring signal transmitted to the line. The reflected signal propagates to the amplifying means 60. The amplifying means 60 amplifies the received reflected signal, after which the A/D converter 30 converts the amplified signal into a digital signal. The amplifying means 50, 60 on the receiving side of the measuring apparatus have been connected to different sides of the attenuating means, whereby the reflection coefficient can be calculated using the voltage across the attenuating means 70.

The output signal of the amplifying means 50, which contains information on the amplitude of the transmitted measuring signal, is also forwarded to the A/D converter 30 which converts the received analogue signal into digital format. The digital signals generated by the A/D converter are forwarded to the processing means 10. Because the measuring signal is transmitted on different frequencies, the processing means 10 calculates the reflection coefficient in the frequency domain. The measuring signal can be direct voltage, for instance. The frequency of the measuring signal can also be in megahertz. The amplitude of the measuring signal can also vary from a few volts to several tens of volts. The processing means calculates, by means of an inverse Fourier transformation, for instance, impulse responses for the received digital signals reflected from the line, after which the reflection of the measuring signal on different frequencies can be determined. The processing means 10 can also use the FFT or IFFT methods, for instance, in calculating the impulse responses.

Figure 2:
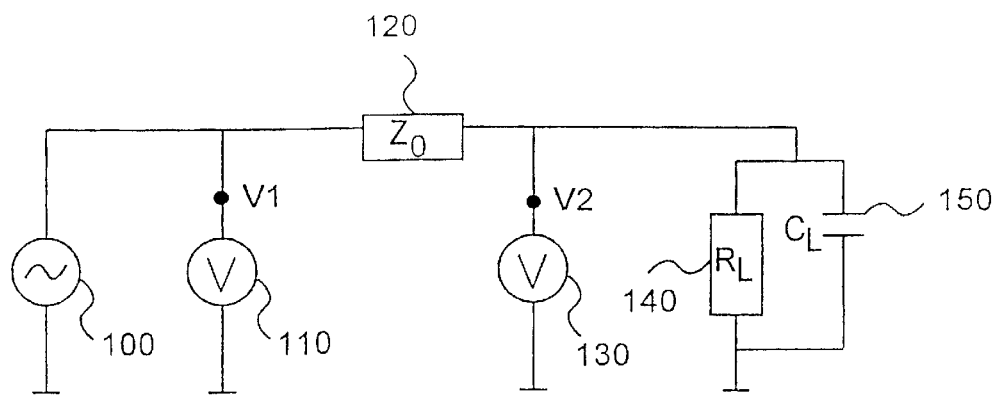
FIG. 2 shows a measuring connection used in the measuring apparatus.

FIG. 2 shows a measuring connection used in the measuring apparatus of the invention. To be more specific, the measuring connection shows the measuring topology used in measuring. The measuring connection comprises a voltage source 100, a measuring resistor 120, a resistor 140, and a capacitor 150. The figure shows that the resistor 140 and capacitor 150 are connected in parallel. The parallel connection of the resistor 140 and capacitor 150 illustrates a simple model of a subscriber line whose impedance is $Z_L$. The measuring connection also comprises measuring means 110 and 130 which measure voltages at different points of the measuring connection.

The voltage source 100 feeds the resistor 140 through the measuring resistor 120 so that the measuring means 110 can measure the voltage V1 generated in the first end of the measuring resistor. In addition, the voltage source 100 generates a voltage V2 at the other end of the measuring resistor. The measuring means 130 can then measure the voltage V2. The measuring means 110, 130 are voltmeters which can, in practice, be implemented in many ways.

The following describes the calculation of the reflection coefficient. First, the current that has passed through the measuring resistor 120 and capacitor 150 is calculated as follows:

$$i = \frac{V_1 - V_2}{Z_0}.$$

After calculating the current, the impedance $Z_L$ of the entire line can be determined as follows:

$$Z_L = \frac{V_2}{i}.$$

Then the formulas described above are combined to:

$$Z_L = \frac{Z_0}{\frac{V_1}{V_2} - 1}.$$

The reflection coefficient is calculated with the formula:

$$\rho_L = \frac{Z_L - Z_0}{Z_L + Z_0},$$

after which the reflection coefficient can be calculated by means of the measured voltages as follows:

$$\rho_L = \frac{\frac{V_2}{V_1 - V_2} - 1}{\frac{V_2}{V_1 - V_2} + 1}.$$

The following are the formulas used in calculating the IDFT (inverse Digital Fourier Transform) transformation. First the voltages V1 and V2 are measured using suitable discrete frequencies. Measuring the voltages is begun with direct voltage. After this, the obtained measuring results are used to calculate the reflection coefficients. Finally, an inverse DFT is calculated from the reflection coefficients. In calculating the inverse DFT, an IFFT algorithm, for instance, can be used, whereby the calculation efficiency can be improved. The outcome of the calculation is the impulse response for the subscriber line as illustrated in the following formula:

$$x(nT) = \frac{1}{N}\sum_{k=0}^{N-1} X(k)e^{jk\Omega nT}, n = 0, 1, \ldots, N-1.$$

In the above formula, X(k) refers to the signal currently in the frequency domain, i.e. the reflection coefficient of the line. T refers to the time between two time-domain sample points. In this case, the size of T is determined by the highest frequency used in measuring. T is thus obtained with the formula:

$$T = \frac{1}{2f_h}.$$

The following shows a calculation example on calculating an inverse DFT. In the example, it is assumed that the measuring resistor is 100 ohm and the resistor 140 is 1 k $\Omega$. It is also assumed that the capacitor 150 is 1 $\mu$F. First, V2 is resolved with the following formula:

$$V_2 = V_1 \frac{R_L}{R_L + R_0(1 + sC_LR_L)},$$

where s=2 $\pi f j$ (j is an imaginary part) and where V1 is assumed to be one.

After this, the reflection coefficient is calculated. Finally, the inverse DFT is calculated using the calculated reflection coefficients. The values obtained in the calculations are shown in the table in FIG. 3.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A measuring method used for checking the condition of a transmission line in which method a measuring signal, a part of which is reflected back, is transmitted to the transmission line and in which method the reflected signal is measured, the method comprising:
   transmitting the measuring signal to the transmission line being measured;
   measuring a magnitude of the measuring signal before the measuring signal is transmitted to the transmission line;
   comparing the obtained measuring result with a magnitude of the measuring signal reflected back from the transmission line;
   calculating a reflection coefficient for the transmission line in the frequency domain using the obtained measuring results; and
   calculating an impulse response for the transmission line using the reflection coefficient in the frequency domain, and
   wherein the measuring signal is generated from a digital signal which is converted into an analogue signal whose magnitude is measured, after which the signal converted into analogue format is transmitted attenuated as the actual measuring signal.

2. The method as claimed in claim 1, wherein a frequency of the measuring signal is changed from time to time.

3. The method as claimed in claim 1, wherein the impulse response is calculated with an inverse Fourier transformation, or using a method corresponding to the inverse Fourier transformation, from the reflection coefficient in the frequency domain.

4. The method as claimed in claim 1, wherein the measuring signal is attenuated after the magnitude of the measuring signal to be transmitted to the transmission line has been measured.

5. The method as claimed in claim 1, wherein the signal reflected back is amplified, if necessary, after which the signal is converted into a digital signal.

6. The method as claimed in claim 1, wherein the measuring signal reflected from the transmission line is converted from the frequency domain to the time domain.

7. A measuring apparatus used for checking the condition of a transmission line which apparatus transmits a measuring signal to the transmission line, a part of which signal is reflected back to the measuring apparatus which comprises a processing means for measuring the reflected signal, the measuring apparatus comprising:
   the processing means to transmit the measuring signal to the transmission line;
   the processing means to measure a magnitude of the measuring signal before the measuring signal is transmitted;
   the processing means to compare the measuring result with the magnitude of the reflected measuring signal;
   the processing means to calculate a reflection coefficient for the transmission line in the frequency domain using the measuring results; and
   the processing means to calculate an impulse response for the transmission line using the reflection coefficient in the frequency domain, and
   wherein the measuring apparatus comprises an attenuating means, which receives the measuring signal whose magnitude has already been measured, and, while the measuring signal propagates through the attenuating means, forms the actual measuring signal.

8. The measuring apparatus as claimed in claim 7, wherein the processing means changes a frequency of the measuring signal from time to time.

9. The measuring apparatus as claimed in claim 7, wherein the processing means calculates the impulse response using an inverse Fourier transformation, or a method corresponding to the inverse Fourier transformation, from the reflection coefficient in the frequency domain.

10. The measuring apparatus as claimed in claim 7, wherein the measuring apparatus comprises an amplifier which amplifies the measuring signal reflected back to the measuring apparatus.

11. The measuring apparatus as claimed in claim 7, wherein the measuring apparatus comprises an A/D converter which converts the reflected measuring signal into a digital signal which is forwarded to the processing means which processes the received signal using an inverse Fourier transformation.

12. The measuring apparatus as claimed in claim 7, wherein the processing means converts the reflected measuring signal, which is in the frequency domain, into the time domain using an inverse Fourier transformation, for instance.

13. The measuring apparatus as claimed in claim 7, wherein the measuring apparatus comprises an A/D converter which converts the reflective measuring signal into a digital signal which is forwarded to the processing means, wherein said processing means is configured to process the signal according to a process which corresponds to an inverse Fourier transformation.

* * * * *